United States Patent [19]

Kazino et al.

[11] Patent Number: 4,579,492

[45] Date of Patent: Apr. 1, 1986

[54] PLASTIC SCREW ANCHOR

[75] Inventors: Hiroshi Kazino, Komaki; Masaaki Ide, Aichi; Tomiyasu Kakeno, Kounan, all of Japan

[73] Assignee: Kabushiki Kaisha Aoyama Seisakusho, Nagoya, Japan

[21] Appl. No.: 517,772

[22] Filed: Jul. 27, 1983

[30] Foreign Application Priority Data

Oct. 12, 1982 [JP] Japan .................. 57-154122[U]

[51] Int. Cl.[4] ............................................. F16B 13/06
[52] U.S. Cl. ...................................... 411/60; 411/15; 411/182
[58] Field of Search ............... 411/15, 33, 39, 40, 411/44, 57, 60, 61, 173–175, 182; 24/297

[56] References Cited

U.S. PATENT DOCUMENTS

| 2,836,215 | 5/1958 | Rapata | 411/15 |
| 3,241,428 | 3/1966 | Fischer | 411/60 |
| 3,323,404 | 6/1967 | Fischer | 411/60 |
| 4,240,323 | 12/1980 | Kojima | 411/15 |

OTHER PUBLICATIONS

"Shakeproof Plasti-Grommet" brochure copyright by Shakeproof, Division of Illinois Tool Works, Chicago, 1954, (4 pages).

Primary Examiner—Kenneth J. Dorner
Assistant Examiner—Neill Wilson
Attorney, Agent, or Firm—Birch, Stewart, Kolasch & Birch

[57] ABSTRACT

A plastic screw anchor having legs each formed with a recess which provides the leg with good flexibility whereby the legs can easily deform during the insertion thereof into an aperture of a supporting plate and also provides a strong grip between the screw anchor and the supporting plate. A wing integrally formed on each leg prevents the screw anchor from coming out of the aperture after having once been inserted therein.

4 Claims, 5 Drawing Figures

PLASTIC SCREW ANCHOR

BACKGROUND OF THE INVENTION

1. Field of the Invention

This invention relates to a plastic screw anchor used for receiving a self-tapping screw to fasten and secure a structural element (e.g. a plate or small mechanical part) to a support member by the self-tapping screw.

2. Description of Background Art

It is a recent tendency to make many kinds of mechanical parts from synthetic resin for the sake of cost reduction, weight reduction and improvement of corrosion resistance and appearance.

The screw anchor is one of the mechanical parts which has been developed in line with this tendency as seen from those disclosed, for example, in the U.S. Pat. Nos. 2,788,047, 2,836,214 and 2,956,605.

However, the conventional plastic screw anchor has several disadvantages as follows.

Firstly, since the legs of the conventional plastic screw anchor are formed thick and stiff, they are therefore not easily deformable in accordance with the dimensions of an aperture formed in a supporting plate when the legs are inserted into the aperture of the supporting plate. Because of this, careful attention must be given to accurately forming the aperture so that the legs of the screw anchor smoothly fit into the aperture. This is very troublesome and reduces working efficiency of the screw anchor.

Furthermore, a strong pressing force is required for inserting the legs of the screw anchor into the aperture of the supporting plate when the tolerance between the aperture and the legs is small.

Secondly, the conventional screw anchor is liable to fall out from the aperture of the supporting plate after having been once inserted thereinto when the tolerance between the aperture and the legs is large.

Thirdly, the gripping engagement between the conventional screw anchor and the supporting plate is unreliable, since the legs of the screw anchor are stiff so that the edges of the aperture cannot easily bite into the legs when a self-tapping screw has been screwed into the screw anchor.

SUMMARY AND OBJECTS OF THE INVENTION

Accordingly, the object of the present invention is to provide a screw anchor which eliminates these disadvantages of the conventional screw anchor.

This object is achieved by providing a recess and a wing in each of the legs of the screw anchor for partially reducing the cross-sectional area of each leg and thereby providing it with better flexibility.

Further objects and advantages of the present invention will become apparent from the following description taken in conjunction with the accompanying drawings in which:

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
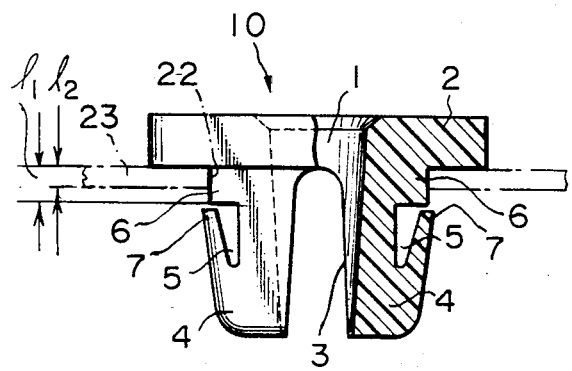
FIG. 1 is an elevational view of a screw anchor of the present invention partially taken in cross-section thereof.

Prior to explaining the present screw anchor, a conventional screw anchor 10 of the prior art will be explained with reference to FIGS. 4 and 5 in order to further clarify the difference between the screw anchor of the present invention and the prior art.

The conventional screw anchor 10' of the prior art comprises a head 2 and two oppositely arranged legs 4. An arched groove 3 is formed between the legs 4. A center bore 1 is formed for receiving a self-tapping screw after the screw anchor 10' has been inserted into an aperture formed in a supporting plate in order to secure a structural element to the supporting plate. The method for securing the structural element to the supporting plate is the same as that carried out by the use of the screw anchor 10 of the present invention and it will be hereinafter explained in detail.

Figure 4:
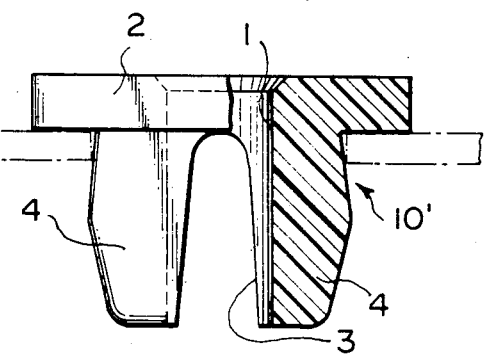
FIG. 4 is an elevational view of a screw anchor of the prior art.

As clearly shown in FIG. 4, the legs 4 are formed thick over whole length thereof. Thus, the stiffness of the legs 4 is very large and therefore, the legs 4 do not easily deform inward when they are inserted into the aperture of the supporting plate. Therefore, a stong pressing force is required to insert the legs into the aperture of the supporting plate if the aperture is formed smaller than the external dimension of the legs. On the contrary, if the aperture of the supporting plate is formed larger than the external dimensions of the legs 4, the legs 4 will be loosely inserted into the aperture and therefore they will easily come out again after the insertion into the aperture. Thus, the aperture of the supporting plate should be carefully and exactly formed so as to give a worker a positive and proper fitting feeling when the legs 4 are inserted into the aperture. This is troublesome and reduces the working efficiency of the screw anchor.

Furthermore, since the legs 4 of the conventional screw anchor 10' have a large stiffness, they do not easily deform outwardly when the self-tapping screw is inserted into the center bore 1. Thus, the legs 4 are not deeply bitten into by the peripheral edge of the aperture of the supporting plate and therefore, the grip or bite between the legs 4 and the supporting plate is insufficient. Accordingly, the screw anchor 10' of the prior art can be easily pulled out by a relatively small pulling force and it does not provide a sufficiently reliable connection between the structural element and the supporting plate.

Figure 2:
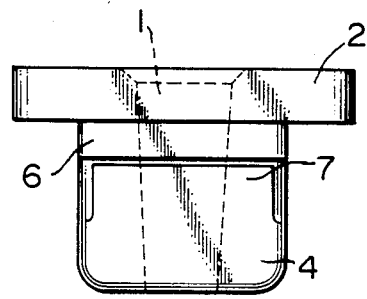
FIG. 2 is a side view of the screw anchor of FIG. 1.
Figure 3:
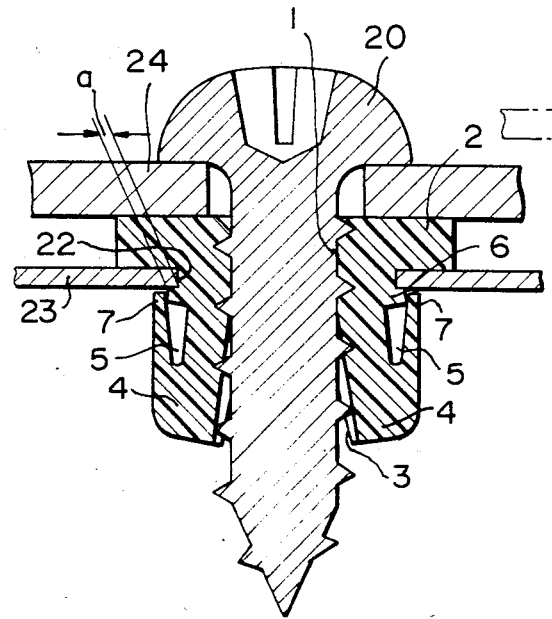
FIG. 3 is a cross-sectional elevation view of the screw anchor of the present invention as used in conjunction with a self-tapping screw for securing a structural element to a supporting plate.
Figure 5:
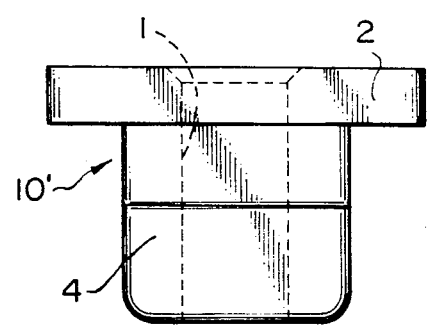
FIG. 5 is a side view of the screw anchor of FIG. 4.

FIGS. 1 through 3 show a screw anchor 10 of the present invention, in which the same numeral are used for designating portions corresponding to those of the conventional screw anchor 10' shown in FIGS. 4 and 5.

The screw anchor 10 of the present invention has a head 2, two oppositely arranged legs 4, a center bore 1 for receiving a self-tapping screw 20 (FIG. 3), and an arched groove 3 formed between the two legs 4. This arrangement is substantially identical to that of the conventional screw anchor 10' shown in FIGS. 4 and 5.

However, according to the screw anchor 10 of the present invention, a recess 5 is formed in each of legs 4. The recess 5 extends in the lateral direction of each leg 4 at an external surface thereof. The provision of the recess 5 reduces the cross-sectional area of each leg 4 and therefore the stiffness thereof. Furthermore, by the provision of the recess 5, a neck portion 6 is formed in each leg 4 in a region immediately adjacent to the under surface of the head 2. Another characteristic feature of the present screw anchor 10 resides in the provision of a wing 7 in each leg 4. The wing 7 extends upward and gradually outward from the bottom of each leg 4 toward the neck portion so that the top of the wing 7 somewhat laterally projects from the neck 6 as clearly shown in FIG. 1. As shown in FIG. 2, it is preferable to so arrange the wing 7 that it almost completely covers the recess 5.

Since the stiffness of the legs 4 is reduced according to the present screw anchor 10, the legs 4 are easily deformable inward when they are inserted into an aperture 22 of the supporting plate 23. Thus, the legs 4 can be smoothly inserted into the aperture 22 without need for a strong pressing force on the head 2 of the screw anchor 10 even though the aperture 22 is formed smaller than the external dimensions of the legs 4.

Furthermore, since the wings 7 instantaneously spread outward beyond the aperture 22 just after their passage therethrough, the inserted screw anchor 10 can not be extracted without again pressing the wings 7 inward of the aperture 22. This makes it easy to carry out the securing operation at a place in which the worker cannot easily operate. Also, the outward expansion of the wings 7 just after passing through the aperture 22 gives the worker the feeling of a "snap" which tells him that the legs 4 of the screw anchor 10 have been successively inserted into the aperature 22.

Another remarkable effect provided by the present screw anchor 10 is that the edge of the aperture 22 of the supporting plate 23 deeply bites into the neck portion 6 of the legs 4 as shown by "a" in FIG. 3 when the self-tapping screw 20 has been threaded into the center bore 1, since the legs 4 can be easily deformed outwardly owing to the insertion of the self-tapping screw 20. Simultaneously with the outward deformation of the legs 4, the top of each wing 7 so approaches toward the under surface of the supporting plate 23 that it contacts with or almost contacts with the under surface of the supporting plate 23. The deep bite "a" of the edge of the aperture 22 into the legs 4 as well as the engagement of the tops of the legs 4 with the under surface of the supporting plate 23 provide a strong grip or bite between the screw anchor 10 and the supporting plate 23. Thus, the grip between the screw anchor 10 and the supporting plate 23 is greatly improved over that between the conventional screw anchor 10' and the supporting plate. Numeral 24 in FIG. 3 is a structual element (e.g., a plate or small mechanical part) to be secured to the supporting plate 23 by the present screw anchor.

The screw anchor 10 of the present invention can be formed of any kind of synthetic resion, preferably of nylon-6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination of a plastic screw anchor and a supporting plate to which the anchor is secured comprising:
   said plastic screw anchor including a head having a top surface and an under surface;
   oppositely arranged legs extending downward from said under surface of the head;
   a center bore formed through the head and the legs for receiving a self-tapping screw;
   an arched groove formed between the legs;
   the legs each having a recess extending laterally from the external surface of the legs and a wing extending upward and gradually outward from the bottom of the leg; and
   a neck portion formed between the under surface and the recess;
   said supporting plate including an aperture through which the plastic screw anchor is fitted;
   said head of the plastic screw anchor is adapted to be sandwiched between the supporting plate and a structural element attached at the top surface of the head when the self-tapping screw is threaded into the center bore; and,
   the neck portion of the plastic screw anchor includes a longitudinal height greater than the thickness of the supporting plate.

2. A combination of a screw anchor and a supporting plate to which the anchor is secured comprising: said screw anchor including
   a head having a top surface and an under surface;
   oppositely arranged legs extending downward from said under surface of said head;
   a center bore formed through said head and said legs for receiving a self-tapping screw;
   an arched groove formed between said depending legs;
   a supporting plate;
   said head being adapted to be sandwiched between said supporting plate to which said screw anchor is fitted at the under surface of said head and a structural element attached at the top surface of said head to be secured to said supporting plate;
   said legs each include a recess extending laterally from the external surface of said legs and a wing extending upward and gradually outward from the bottom of said leg; and
   a neck portion formed between said under surface and said recess wherein said neck portion has a longitudinal height greater than the thickness of said supporting plate and said wing extends toward said neck portion.

3. The combination of claim 2 in which the top of the wing somewhat laterally projects from the neck.

4. The combination of claim 2 in which the anchor is made of nylon-6.

* * * * *